H. B. & C. L. STEINHOUSE.
BOLT.
APPLICATION FILED DEC. 1, 1910.
1,028,795.
Patented June 4, 1912.
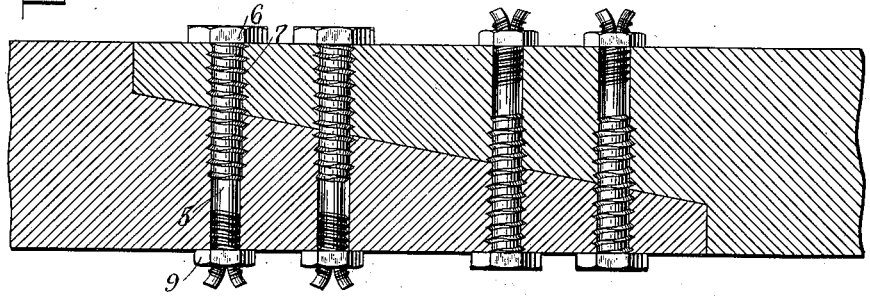
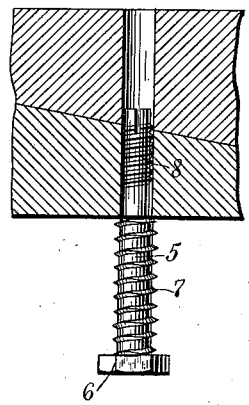
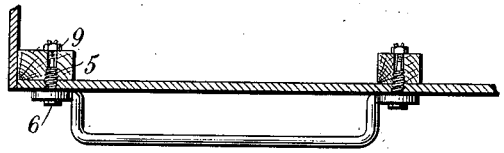
WITNESSES:
INVENTORS
Harry B. Steinhouse
Clarence L. Steinhouse
BY
ATTORNEYS

UNITED STATES PATENT OFFICE.

HARRY B. STEINHOUSE AND CLARENCE L. STEINHOUSE, OF CAIRO, ILLINOIS.

BOLT.

1,028,795. Specification of Letters Patent. Patented June 4, 1912.

Application filed December 1, 1910. Serial No. 595,025.

*To all whom it may concern:*

Be it known that we, HARRY B. STEINHOUSE and CLARENCE L. STEINHOUSE, citizens of the United States, and residents of Cairo, in the county of Alexander and State of Illinois, have invented a new and Improved Bolt, of which the following is a full, clear, and exact description.

The invention is an improvement in bolts for securing together two or more parts, one of which is wood, or such other material into which a lag screw may be threaded.

The invention has in view a bolt which, when applied, will not work loose or pull from the timber in which it is placed, making it especially adaptable for securing freight car grab irons, ladder rungs, splices, etc. To this end the bolt is provided with wood screw threads for a substantial length of its body adjacent to the head, and with the outer end portion of the body reduced in diameter and screw-threaded to receive the nut, this end of the bolt being also preferably split so that it can be expanded and thus prevent the nut from accidentally unscrewing.

Reference is to be had to the accompanying drawings forming a part of this specification, in which similar characters of reference indicate corresponding parts in all the views.

Figure 1 is a longitudinal section through a splice between two timbers, the timbers being secured together at the splice by a number of our improved bolts; Fig. 2 is a similar fragmentary section, showing one of the bolts in position preparatory to screwing it into the timbers; and Fig. 3 is a section through one side of a freight car, showing a grab iron applied thereto with bolts constructed in accordance with our invention.

The bolt is made of any required size to suit conditions, and comprises a body 5 and a head 6. The portion of the body adjacent to the head and for a substantial length of the body is provided with wood screw threads 7, such threads, for example, as are commonly placed on a lag screw. The outer end portion of the body of the bolt is reduced in diameter and is threaded as indicated at 8 to receive a nut 9. This end of the bolt body is also preferably split centrally and longitudinally for a substantial distance, which is for the purpose of expanding the bolt after the nut has been applied and tightened. The expansion of this bifurcated or split portion of the bolt may be accomplished by any suitable instrument, such as a cold chisel, which is driven between the divided portions, bending them to the opposite sides of the nut, as shown in Fig. 1. With the bolt thus applied it is not likely to work loose as long as the timber into which it is threaded remains sound, and even after this takes place, the bolt cannot be pulled out, which makes it especially suitable for applying such devices as grab irons and ladder rungs to freight cars, where it is desired to eliminate the element of risk so far as possible.

We have shown for convenience of illustration the bolt applied to the splice between two timbers, and also as securing a grab iron to a freight car. It is, however, to be understood that the bolt can be used with advantage in numerous other relations, and that the same can be modified within the scope of the appended claims without departing from the scope of the invention.

Having thus described our invention, we claim as new and desire to secure by Letters Patent:

1. A bolt for securing objects in contact with each other, having a head at one end for engaging one of the objects and provided with wood screw threads extending from the head for the greater portion of its length, the diamter of the remainder of the bolt being approximately equal to the diameter of the body of the said threaded portion and provided with screw threads to receive a nut for engaging the other object, the end of the reduced portion of the bolt being split longitudinally.

2. The combination with two wooden members having registering apertures, the apertures being of the same size to form a bore of uniform diameter, of a headed bolt in the bore with its head against one member, said bolt being provided with wood threads extending from the head for the greater portion of its length and screwing into the said members, the remainder of the bolt being slightly reduced and provided with screw threads, and a nut on the said reduced and threaded end and engaging the other member.

In testimony whereof we have signed our names to this specification in the presence of two subscribing witnesses.

HARRY B. STEINHOUSE.
CLARENCE L. STEINHOUSE.

Witnesses:
HARRY L. SERBIAN,
ELMER E. COMINGS.